US012654784B2

(12) United States Patent
Auerbach et al.

(10) Patent No.: US 12,654,784 B2
(45) Date of Patent: Jun. 16, 2026

(54) AIR GUIDING DEVICE OF A MOTOR VEHICLE BODY

(71) Applicant: Dr. Ing. h.c. F. Porsche Aktiengesellschaft, Stuttgart (DE)

(72) Inventors: Michael Auerbach, Marbach am Neckar (DE); Philipp Schroeder, Korntal-Münchingen (DE); Ronny Becker, Leutenbach (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 401 days.

(21) Appl. No.: 18/242,107

(22) Filed: Sep. 5, 2023

(65) Prior Publication Data

US 2024/0116580 A1 Apr. 11, 2024

(30) Foreign Application Priority Data

Oct. 11, 2022 (DE) ..................... 10 2022 126 265.0

(51) Int. Cl.
*B62D 35/00* (2006.01)
*B60R 13/07* (2006.01)

(52) U.S. Cl.
CPC ............ *B62D 35/007* (2013.01); *B60R 13/07* (2013.01)

(58) Field of Classification Search
CPC .............................. B62D 35/007; B60R 13/07
See application file for complete search history.

(56) References Cited

U.S. PATENT DOCUMENTS

| | | | | |
|---|---|---|---|---|
| 7,226,117 B2 * | 6/2007 | Preiss | ................. | B62D 35/007 |
| | | | | 296/180.1 |
| 10,864,951 B2 * | 12/2020 | Wolf | .................... | B62D 35/007 |
| 11,279,213 B2 * | 3/2022 | Hickey | ................. | E05F 1/1292 |
| 2018/0111457 A1 * | 4/2018 | Mori | ........................ | B60J 10/70 |
| 2019/0002036 A1 | 1/2019 | Stablo | | |

FOREIGN PATENT DOCUMENTS

| | | |
|---|---|---|
| EP | 3397541 A1 | 11/2018 |
| JP | 02151583 A | 6/1990 |
| JP | 2018172042 A | 11/2018 |

OTHER PUBLICATIONS

Vogelgesang, "Motor vehicle, in particular passenger cars", Nov. 14, 2002, DE4310879C2 (Year: 2002).*

* cited by examiner

*Primary Examiner* — Jonathan Malikasim
(74) *Attorney, Agent, or Firm* — Buchanan Ingersoll & Rooney PC

(57) ABSTRACT

An air guiding device of a motor vehicle body includes a roof spoiler arranged on a rearward end of a roof of the motor vehicle body and above a rear window of the motor vehicle body. The roof spoiler includes a first spoiler portion extending along a transverse body axis (Y) and a second spoiler portion extending along a vertical body axis (Z). The roof spoiler includes an unmovable air guiding element and a movable air guiding element, which is movably received in an element opening of the unmovable air guiding element. For water drainage, the air guiding device includes a channel system, which is configured so as to receive and discharge water. The roof spoiler includes a spoiler entry opening. The channel system is configured so as to guide the water starting from the spoiler entry opening via the second spoiler portion to an environment.

8 Claims, 2 Drawing Sheets

AIR GUIDING DEVICE OF A MOTOR VEHICLE BODY

CROSS-REFERENCE TO RELATED APPLICATION

This application claims priority to German Patent Application No. 10 2022 126 265.0, filed Oct. 11, 2022, the content of such application being incorporated by reference herein in its entirety.

FIELD OF THE INVENTION

The invention relates to an air guiding device of a motor vehicle body.

BACKGROUND OF THE INVENTION

Air guiding devices for influencing an air flow around and/or over the motor vehicle body are known. They serve to guide an air flow forming along the motor vehicle body, and can be used in order to induce increased lift and to reduce air resistance. The air guiding devices of this type are also commonly referred to as spoilers.

For example, EP 3 397 541 B1, which is incorporated by reference herein, discloses an air guiding device of a motor vehicle body in the form of an adjustable roof spoiler with a movable air guiding element and an unmovable air guiding element, and with a system for discharging water, wherein the system has a V-shaped surface of the roof spoiler.

JP 2018-172042 A, which is incorporated by reference herein, discloses a motor vehicle having a roof spoiler and a tailgate, wherein the tailgate and the roof spoiler limit a water drainage channel.

JPH 02-151583 A, which is incorporated by reference herein, also discloses an air guiding device of a motor vehicle body in the form of a roof spoiler, wherein two side spoilers connect to the roof spoiler, and wherein the water entering the roof spoiler can drain into the exterior environment via a drainage opening formed on each side spoiler.

SUMMARY OF THE INVENTION

An air guiding device of a motor vehicle body according to the present invention comprises a roof spoiler, wherein the roof spoiler is arranged at a rearward end of a roof of the motor vehicle body and above a rear window of the motor vehicle body. The roof spoiler has a first spoiler portion extending along a transverse body axis and a second spoiler portion extending along a vertical body axis. It has an unmovable air guiding element and a movable air guiding element, which is movably received in an element opening of the unmovable air guiding element. According to the present invention, for water drainage, the air guiding device comprises a channel system, which is configured so as to receive and discharge water, wherein the roof spoiler comprises a spoiler entry opening, and wherein the channel system is configured so as to guide water starting from the spoiler entry opening via the second spoiler portion to an environment and/or into a sealing channel of a body shell of the motor vehicle body. In other words, the roof spoiler is configured so as to receive the water and transmit it in a directed manner. The advantage is a directed dewatering of water striking or accumulated on the roof spoiler, roof, tailgate, and rear window so that water ingress into an interior of the vehicle body can be avoided, for example, when opening the tailgate. Likewise, a soiling of the motor vehicle body after a washing operation can be avoided, at least reduced.

The channel system comprises at least one channel extending from the spoiler entry opening to an exit opening of the channel system, which is characterized by a correspondingly advantageous curvature, in other words an increased transverse crowning, so that the water can be quickly discharged from a roof spoiler interior to the environment. For this purpose, the element opening advantageously comprises a first channel of the channel system extending in the direction of the transverse body axis, which comprises a transverse crowning extending in the direction of the roof.

Advantageously, the water guided into the interior of the spoiler can be channeled in a directed manner with the aid of geometrically optimized parts of the roof spoiler, such as the unmovable air guiding element, an intermediate element, and a sub-element, in order to then be passed on into the environment. For this purpose, the parts, for example the air guiding element, the intermediate element, and the sub-element comprise channels of the channel system, which are connected to one another in a perfusable manner and are also advantageously curved.

The second spoiler portion, which is lateral to the rear window, also comprises a channel of the channel system, which is configured so as to discharge the water directly to the environment or into the sealing channel of the body shell.

The channel(s) of the channel system, which are arranged opposite the rear window, advantageously comprise a sealing element, so that the water cannot escape from the respective channel uncontrolled.

The further aspect of the invention relates to a motor vehicle body comprising an air guiding device with a roof spoiler, wherein the roof spoiler is arranged at a rearward end of a roof of the motor vehicle body and above a rear window of the motor vehicle body, which is configured with the air guiding device. The advantage is the avoidance of water ingress into the interior of the body, for example when opening the tailgate.

BRIEF DESCRIPTION OF THE DRAWINGS

Further advantages, features, and details of the invention are shown in the following description of preferred embodiment examples as well as the drawings. The features and feature combinations specified in the foregoing description, as well as the features and feature combinations specified hereinafter in the description of the drawings and/or shown alone in the drawings, are able to be used not only in the respectively indicated combination, but also in other combinations, or on their own, without departing from the scope of the invention. Shown are.

DETAILED DESCRIPTION OF THE INVENTION

Figure 1:
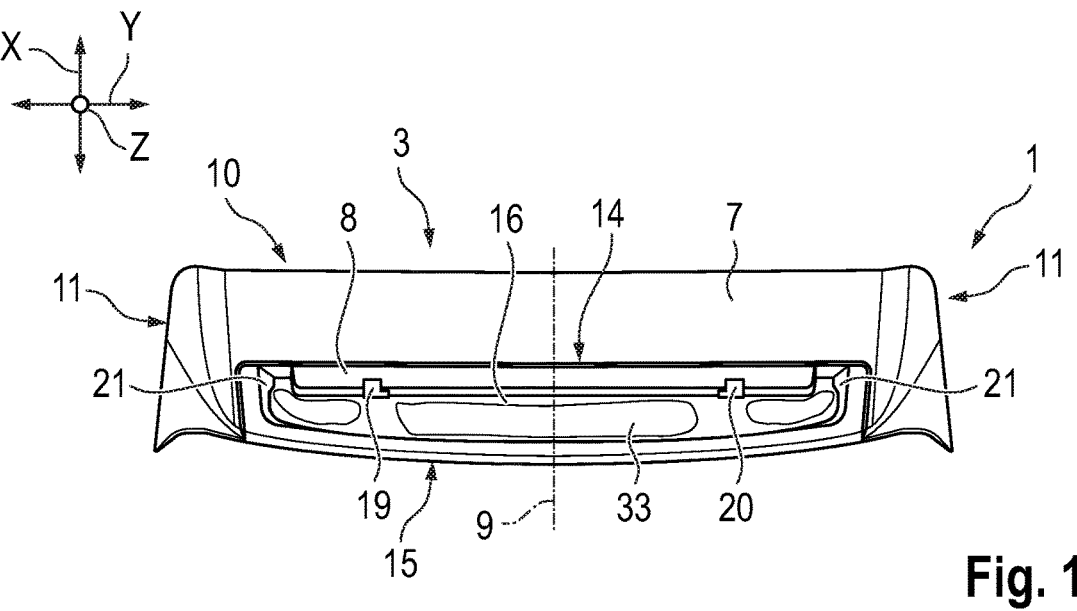
FIG. 1 depicts in a top plan view, an air guiding system of a motor vehicle body of a motor vehicle according to aspects of the invention, with a disassembled movable air guiding element.

An air guiding device 1 according to aspects of the invention of a motor vehicle body 2 is configured according to FIG. 1, and comprises a roof spoiler 3, which is arranged at a rearward end 4 of a roof 5 of the motor vehicle body 2 along a body axis Z of the motor vehicle body 2 above a rear window 6 of the motor vehicle body 2. The roof spoiler 3, which comprises an unmovable air guiding element 7 and a movable air guiding element 36 movably arranged in an element opening 8 of the unmovable air guiding element 7, has a first spoiler portion 10 extending along a transverse body axis Y of the motor vehicle body 2 and a second spoiler portion 11 extending along the vertical body axis Z.

The second spoiler portion 11 can also be referred to as a side spoiler, wherein the second spoiler portion 11 then extends along the vertical body axis Z and is formed adjacent thereto up to an end of the rear window 6 facing away from the roof 5. That is to say, in other words, that the second spoiler portion 11 can be configured differently in its extension along the vertical body axis Z. Likewise, the second spoiler portion 11 can also have only a short extension along the vertical body axis Z.

The roof spoiler 3 further comprises an intermediate element 12, which is arranged between the unmovable air guiding element 7 and an air guiding sub-element 13 of the roof spoiler 3. In the present embodiment example, the intermediate element 12 and the sub-element 13 are also configured unmovably.

The intermediate element 12 extends on a lower surface 38 of the unmovable air guiding element 7 across the first spoiler portion 10 and at least partially across the second spoiler portion 11. In this embodiment example, the sub-element 13, on the other hand, is only configured so as to extend beyond the first spoiler portion 10.

At this point, it should be mentioned that the concept of an extension along a vertical body axis Z, or transverse body axis Y, or a longitudinal body axis X formed orthogonally to these body axes Y, Z is not meant as a one-dimensional extension, but rather a predominant extension here relative to the further axes X, Y, Z. Of course, for example, the roof spoiler 3 extends in the direction of the longitudinal body axis X, the transverse body axis Y, and the vertical body axis Z, as it is a three-dimensional component.

The air guiding device 1 according to aspects of the invention has a channel system 15 for draining water, which is configured so as to receive and discharge water 33, wherein the roof spoiler 3 comprises a spoiler entry opening 14, via which the water 33 can penetrate into the roof spoiler 3. The channel system 15 is configured so as to guide the water 33 from the spoiler entry opening 14 via the second spoiler section 11 to an environment 30 and/or into a sealing channel of a body shell of the motor vehicle body 2, which is not shown in greater detail.

The channel system 15 extends completely over the roof spoiler 3, wherein the unmovable air guiding element 7 comprises a first channel 16 of the channel system 15, the intermediate element 12 comprises a second channel 17 of the channel system 15, and the sub-element 13 comprises a third channel 18 of the channel system 15, wherein channels 16, 17, 18 are designed for accelerated water drainage.

In the element opening 8, the unmovable air guiding element 7 comprises the first channel 16, which is curved relative to the roof 5 in the direction of the rear window 6 along the vertical body axis Z, wherein it is curved oppositely in a center of the first channel 6, thus in the direction of the roof 5, and thus has a transverse crowning. In other words, it is formed so as to be undulating in a side view.

Furthermore, the first channel 16 for the directed supply of water to the intermediate element 12 comprises a first passage opening 19 and a second passage opening 20, each of which are arranged centrally relative to a body center axis 9 of the motor vehicle body 2, preferably centrally from an outer channel wall 21.

Figure 2:
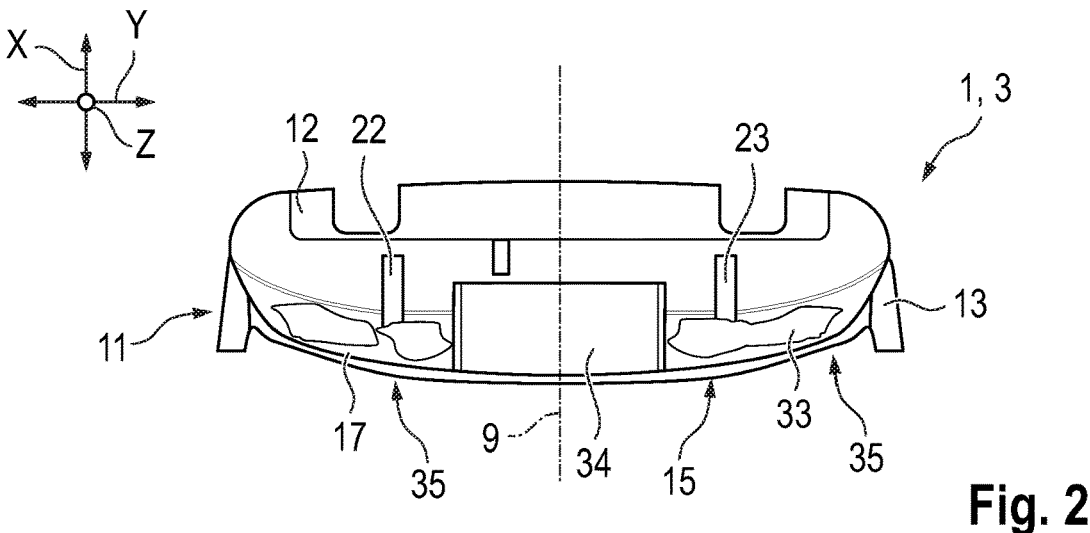
FIG. 2 depicts in a plan view, an intermediate element of the air guiding device according to aspects of the invention.

The water is fed via the two openings 19, 20 into the second channel 17, which is also curved along the vertical body axis Z relative to the roof 5 in the direction of the rear window 6. The intermediate element 12, which is depicted in FIG. 2, comprises a third passage opening 22 and a fourth passage opening 23, via which the water is guided into the third channel 18 of the channel system 15, which is formed in the sub-element 13.

Figure 3:
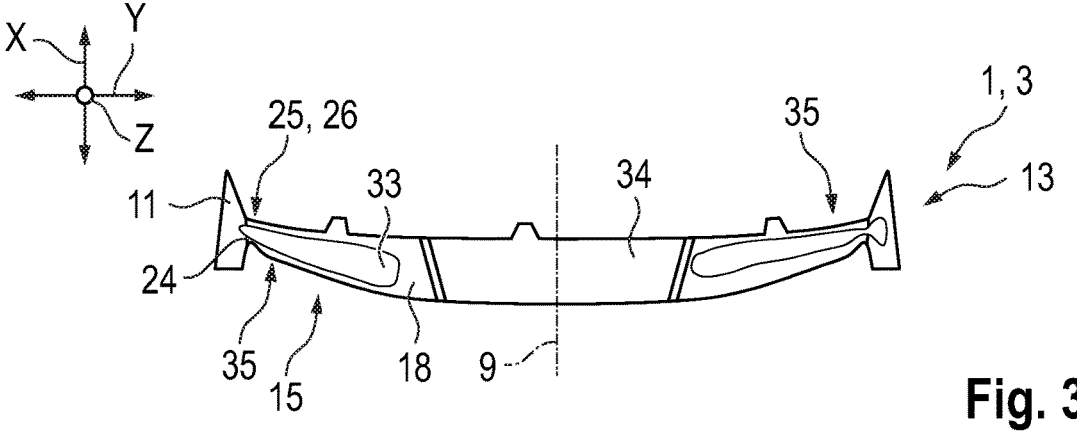
FIG. 3 depicts in a plan view, a subsurface element of the air guiding device according to aspects of the invention.
Figure 4:
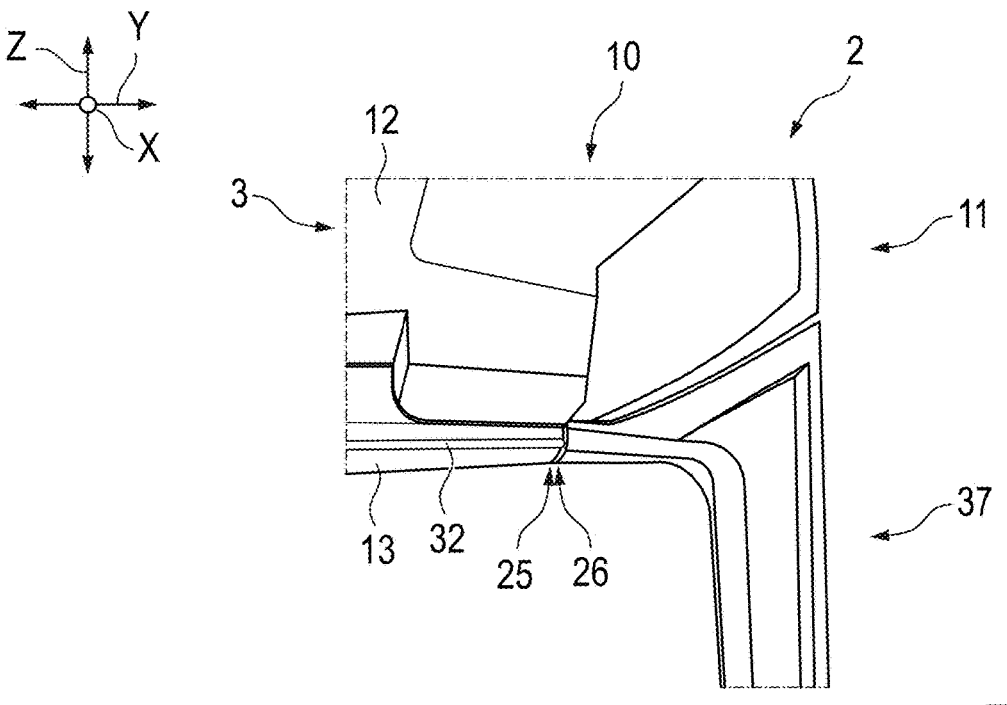
FIG. 4 depicts in a perspective plan view in the direction of an environment of the motor vehicle body, the air guiding device according to aspects of the invention.

The sub-element 13, which is illustrated in FIG. 3, has a respective transfer opening 25 at each of its side edges 24, which is connected in a perfusable manner (e.g., fluid carrying or in fluid communication) to an entry opening 26 formed in the second spoiler portion 11. This entry opening 26 is the entry opening of another channel of the channel system 15, which is formed in the second spoiler portion 11. At its end 28 facing away from the roof spoiler 3, the second spoiler portion 11 has an exit opening 29, via which the water can drain into an environment 30.

In order to ensure that the water 33 guided in the channel system 15 exits the exit opening 29, a sealing element 32 is arranged between the sub-element 13 and the rear window 6 or between a window frame that circumscribes the rear window 6. The second spoiler portion 11 also comprises the sealing element 32, which is arranged between the second spoiler portion 11 and the rear window 6 or the window frame. Thus, in these regions, the channel system 15 is limited (e.g., delimits or forms boundary of) with the help of the sealing element 32.

Figure 5:
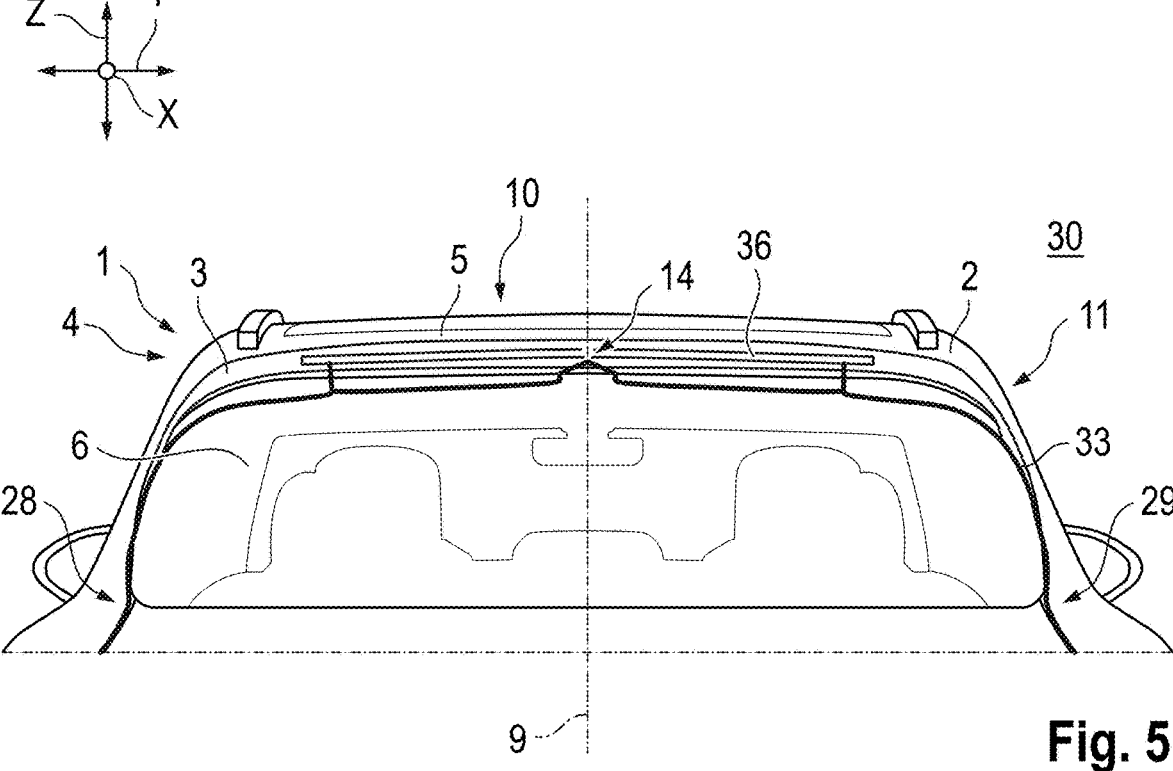
FIG. 5 depicts in a plan view of a rearward end, the vehicle body according to aspects of the invention with a water drainage brought about with the aid of the air guiding device according to aspects of the invention in a schematic view.

FIG. 5 shows, in a top plan view of a rearward end 4, the vehicle body 2 according to aspects of the invention with a water drainage brought about with the aid of the air guiding device 1 according to aspects of the invention in a schematic view. With the aid of the air guiding device 1 according to aspects of the invention, the water is directed from the roof 5, preferably from the center of the roof 5, into the channel system 15, and via the channels 16, 17, 18 perfusably connected to one another by means of the passage openings 19, 20, 22, 23, wherein a discharge of the water 33 into the environment 30 takes place at the end 28 of the second spoiler frame 11.

For further preferred water guidance, the channels 16, 17, 18 are configured so as to extend convexly along the longitudinal body axis X in the direction of the environment 30 in addition to their curvature along the vertical body axis Z.

As illustrated in FIGS. 2 and 3, the second channel 17 and the third channel 18 are separated into two sub-channels 35, respectively, using a ridge 34, so that the water 33 can be guided in a secured manner in the direction of the respective closest second spoiler portion 11.

In a further embodiment example, which is not shown in greater detail, the water 33 can be guided directly into a sealing channel of a shell of the motor vehicle body 2.

LIST OF REFERENCE NUMBERS

1 Air guiding device
2 Motor vehicle body
3 Roof spoiler
4 Rearward end
5 Roof
6 Rear window
7 Unmovable air guiding element
8 Element opening
9 Body center axis
10 First spoiler portion
11 Second spoiler portion
12 Intermediate element
13 Sub-element
14 Spoiler entry opening
15 Channel system
16 First channel
17 Second channel
18 Third channel
19 First passage opening
20 Second passage opening
21 Outer channel wall
22 Third passage opening
23 Fourth passage opening
24 Side edge
25 Transition opening
26 Entrance opening
27 Fourth channel
28 End
29 Exit opening
30 Environment
31 Window frame
32 Sealing element
33 Water
34 Ridge
35 Sub-channel
36 Movable air guiding element
37 Body shell
W Longitudinal body axis
Y Transverse body axis
Z Vertical body axis

What is claimed is:

1. An air guiding device for a motor vehicle body, said air guiding device comprising:

a roof spoiler configured to be arranged on a rearward end of a roof of the motor vehicle body and above a rear window of the motor vehicle body, wherein the roof spoiler comprises a first spoiler portion extending along a transverse body axis (Y) and a second spoiler portion extending along a vertical body axis (Z), and wherein the roof spoiler comprises (i) an unmovable air guiding element and (ii) an air guiding element that is received in an element opening of the unmovable air guiding element; and a channel system for water drainage that is configured to receive and discharge water, wherein the roof spoiler comprises a spoiler entry opening, and wherein the channel system is configured so as to guide water flowing from the spoiler entry opening via the second spoiler portion to a surrounding environment and/or into a body shell of the motor vehicle body, wherein the element opening comprises a first channel of the channel system extending in a direction of the transverse body axis (Y), wherein the roof spoiler comprises an intermediate element arranged along the vertical body axis (Z) below the unmovable air guiding element, which intermediate element comprises a second channel of the channel system, which intermediate element is curved along the vertical body axis (Z) relative to the roof in a direction of the rear window, and which intermediate element is connected to the first channel in a perfusable manner.

2. The air guiding device according to claim 1, wherein the roof spoiler comprises a sub-element arranged along the vertical body axis (Z) below the intermediate element, which sub-element comprises a third channel of the channel system configured to pass the water into the second spoiler portion and which sub-element is connected to the second channel in a perfusable manner.

3. The air guiding device according to claim 2, wherein the second spoiler portion extends along the vertical body axis (Z) and is formed adjacent thereto up to an end of the rear window facing away from the roof.

4. The air guiding device according to claim 3, wherein the second spoiler portion includes an end facing away from the roof spoiler and an exit opening is formed at said end through which the water can drain into the surrounding environment.

5. The air guiding device according to claim 3 further comprising a sealing element disposed between the second spoiler portion and the rear window.

6. The air guiding device according to claim 1 further comprising a sealing element disposed between the roof spoiler and the rear window, which sealing element delimits the channel system.

7. A motor vehicle body comprising the air guiding device of claim 1.

8. A motor vehicle comprising the motor vehicle body of claim 7.

* * * * *